US012564962B2

(12) United States Patent (10) Patent No.: US 12,564,962 B2
Hosomi et al. (45) Date of Patent: Mar. 3, 2026

(54) ROBOT REMOTE OPERATION CONTROL DEVICE, ROBOT REMOTE OPERATION CONTROL SYSTEM, ROBOT REMOTE OPERATION CONTROL METHOD, AND NON-TRANSITORY COMPUTER READABLE MEDIUM

(71) Applicant: Honda Motor Co., Ltd., Tokyo (JP)

(72) Inventors: Naoki Hosomi, Saitama (JP); Anirudh Reddy Kondapally, Saitama (JP); Nanami Tsukamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 17/707,930

(22) Filed: Mar. 29, 2022

(65) Prior Publication Data

US 2022/0314449 A1 Oct. 6, 2022

(30) Foreign Application Priority Data

Mar. 31, 2021 (JP) ................................. 2021-061170
Mar. 31, 2021 (JP) ................................. 2021-061180

(51) Int. Cl.
    B25J 9/16 (2006.01)
(52) U.S. Cl.
    CPC .................................. B25J 9/1689 (2013.01)
(58) Field of Classification Search
    CPC ..... B25J 9/1689; B25J 9/00; B25J 9/16; B25J 3/00; B25J 9/0081; B25J 9/1612; B25J 9/1661; B25J 9/1669; B25J 13/08; B25J 9/163; B25J 13/02; B25J 13/00; G05B 2219/35482; G05B 2219/40607;
    (Continued)

(56) References Cited

U.S. PATENT DOCUMENTS

2018/0284760 A1* 10/2018 Gupta ..................... G06F 3/011
2019/0244309 A1* 8/2019 Ottnad ................... G06Q 50/04
(Continued)

FOREIGN PATENT DOCUMENTS

JP        2017196678       11/2017
JP        6476358          2/2019

OTHER PUBLICATIONS (Ayaka Matsuzaka, "Assistance for Master-Slave System for Objects of Various Shapes by Eye Gaze Tracking and Motion Prediction", 2018, IEEE) (Year: 2018).*
(Continued)

*Primary Examiner* — Adam R Mott
*Assistant Examiner* — Byron Xavier Kasper
(74) *Attorney, Agent, or Firm* — JCIPRNET

(57) ABSTRACT

In a robot remote operation which recognizes a movement of an operator and transmits the movement of the operator to a robot to operate the robot, a robot remote operation control device includes: an information acquisition part, acquiring an environment sensor value acquired by an environment sensor provided in the robot or a surrounding environment of the robot and an operator sensor value, which is information indicating the movement of the operator that is detected; and an intention estimation part, estimating a motion of the operator, which is a motion instruction with respect to the robot, by using a trained model from the operator sensor value.

18 Claims, 12 Drawing Sheets

(58) Field of Classification Search
  CPC ........... G05B 2219/35464; G05B 2219/40131;
          A61B 2019/2273; A61B 2034/741
  See application file for complete search history.

(56) References Cited

U.S. PATENT DOCUMENTS

| 2021/0402593 A1* | 12/2021 | Wake ..................... G06V 40/28 |
| 2023/0341936 A1* | 10/2023 | Inoue ................... G06F 3/0325 |

OTHER PUBLICATIONS

Matsuzaka, "Assistance for Master-Slave System for Objects of Various Shapes by Eye Gaze Tracking and Motion Prediction," Dec. 2018 (Year: 2018).*

Matsuzaka et al., "Assistance for Master-Slave System for Objects of Various Shapes by Eye Gaze Tracking and Motion Prediction," Mar. 14, 2019 (Year: 2019).*

Siddarth Jain et al., "Recursive Bayesian Human Intent Recognition in Shared-Control Robotics", 2018 IEEE/RSJ International Conference on Intelligent Robots and Systems (IROS), Oct. 2018, pp. 3905-3912.

Yang Liu et al., "Prediction of hand motion of operator on a master-slave system", 2018 JSME Conference on Robotics and Mechatronics, with English abstract, Jun. 2, 2018, pp. 1-4.

"Office Action of Japan Counterpart Application", issued on Jul. 2, 2024, with English translation thereof, p. 1-p. 12.

* cited by examiner

| Class | Type of Action |
|-------|----------------|
| First class | Reach |
| Second class | Grasp |
| Third class | Move |
| Fourth class | Release |

3321

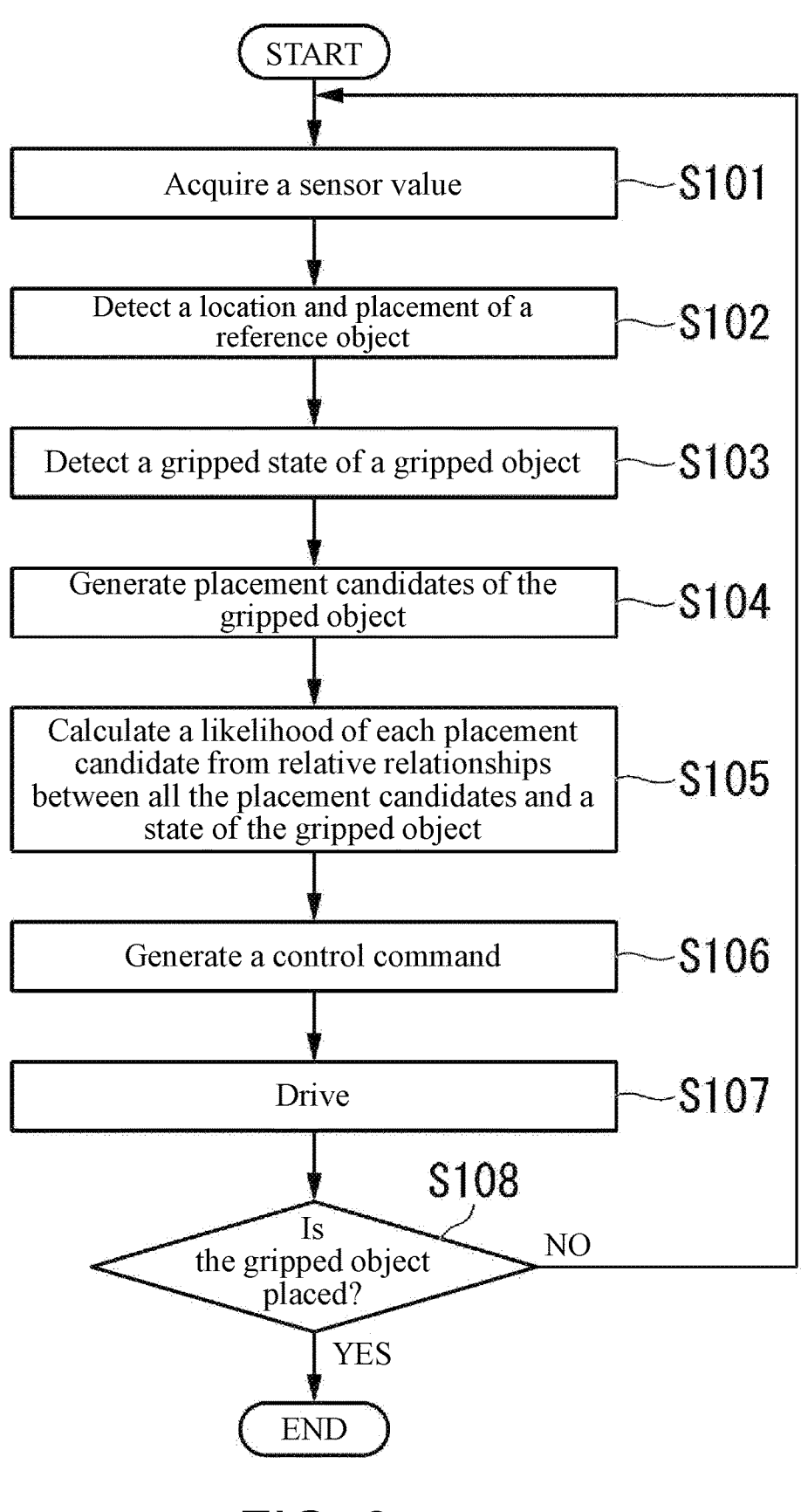

START

Acquire a sensor value　　S101

Detect a location and placement of a reference object　　S102

Detect a gripped state of a gripped object　　S103

Generate placement candidates of the gripped object　　S104

Calculate a likelihood of each placement candidate from relative relationships between all the placement candidates and a state of the gripped object　　S105

Generate a control command　　S106

Drive　　S107

S108

Is the gripped object placed?　　NO

YES

END

FIG. 8

ROBOT REMOTE OPERATION CONTROL DEVICE, ROBOT REMOTE OPERATION CONTROL SYSTEM, ROBOT REMOTE OPERATION CONTROL METHOD, AND NON-TRANSITORY COMPUTER READABLE MEDIUM

CROSS-REFERENCE TO RELATED APPLICATION

This application claims the priority benefit of Japan application serial no. 2021-061170 filed on Mar. 31, 2021 and Japan application serial no. 2021-061180 filed on Mar. 31, 2021. The entirety of each of the above-mentioned patent applications is hereby incorporated by reference herein and made a part of this specification.

BACKGROUND

Technical Field

The invention relates to a robot remote operation control device, a robot remote operation control system, a robot remote operation control method, and a program.

Description of Related Art

A control device with which a user is able to assist the operation of a robot has been proposed. As such control device, for example, Patent Document 1 proposes a control device. The control device includes: a first information acquisition part acquiring first user posture information indicating a first user posture; a second information acquisition part acquiring pre-change posture information indicating a pre-change posture, which is a posture of the robot before the posture of the robot is changed based on the first user posture information; and a determining part, determining a target posture different from the first user posture as the posture of the robot based on the pre-change posture information and the first user posture information acquired by the first information acquisition part at a time point when the robot is performing the pre-change posture indicated by the pre-change posture information. In the system of Patent Document 1, the posture of the robot is changed in correspondence with the posture detected by a device worn by the operator.

In such system, when the operator operates an object by performing a remote operation, it is necessary to estimate which action the operator performs to remotely instruct work contents to the robot from sensors (sensors for acquiring a line of slight, head rotation, location and angle of hand, etc.) worn on the body of the operator.

When performing a Pick & Place operation, etc., to pick and place an object by a remote operation, the robot needs to recognize the target object to be operated by the operator.

PRIOR ART DOCUMENT

Patent Document

[Patent Document 1] Japanese Patent No. 6476358

However, in the conventional art, when the operator performs an operation, such as a Pick & Place operation, to pick and place an object by a remote operation, it is unable to directly estimate which operation the operator is to perform from the sensor value information for each moment obtained from the sensors (e.g., sensors for acquiring a line of sight, head rotation, location and angle of hand) worn on the body of the operator. In addition, in the conventional art, estimation may be unstable in time-series estimation using only the sensor values of the line of sight or the hand movement (in a complicated environment, etc.).

The invention is made in view of the above issue, and an objective of the invention is to provide a robot remote operation control device, a robot remote operation control system, a robot remote operation control method, and a program capable of accurately estimating what action the operator is performing from the information acquired from the sensor worn on the body of the operator.

SUMMARY

According to an aspect of the invention, a robot remote operation control device is provided. In a robot remote operation which recognizes a movement of an operator and transmits the movement of the operator to a robot to operate the robot, the robot remote operation control device includes: an information acquisition part, acquiring an environment sensor value acquired by an environment sensor provided in the robot or a surrounding environment of the robot and an operator sensor value, which is information indicating the movement of the operator that is detected; and an intention estimation part, estimating a motion of the operator, which is a motion instruction with respect to the robot, by using a trained model from the operator sensor value.

According to another aspect of the invention, a robot remote operation control method is provided. In in a robot remote operation which recognizes a movement of an operator and transmits the movement of the operator to a robot to operate the robot, the robot remote operation control method includes: acquiring, by an information acquisition part, an operator sensor value which detects the movement of the operator; and estimating, by an intention estimation part, a motion of the operator, which is a motion instruction with respect to the robot, by using a trained model from the operator sensor value.

According to another aspect of the invention, a non-transitory computer readable medium storing a program is provided. In a robot remote operation which recognizes a movement of an operator and transmits the movement of the operator to a robot to operate the robot, the program causes a computer to: acquire an operator sensor value, which is information indicating the movement of the operator that is detected; and estimate a motion of the operator, which is a motion instruction with respect to the robot, by using a trained model from the operator sensor value.

According to another aspect of the invention, a robot remote operation control device is provided. In a robot remote operation which recognizes a movement of an operator and transmits the movement of the operator to a robot to operate the robot, the robot remote operation control device includes: an information acquisition part, acquiring an environment sensor value acquired by an environment sensor provided in the robot or a surrounding environment of the robot and an operator sensor value detecting the movement of the operator; and an intention estimation part, estimating, from the environment sensor value and the operator sensor value, an intention of the operator based on a probability distribution calculated from a gaze point of the operator in a robot world and a trajectory of a hand of the operator in a robot world.

According to another aspect of the invention, a robot remote operation control method is provided. In a robot remote operation which recognizes a movement of an operator and transmits the movement of the operator to a robot to operate the robot, the robot remote operation control method includes: acquiring, by an information acquisition part, an environment sensor value acquired by an environment sensor provided in the robot or a surrounding environment of the robot and an operator sensor value detecting the movement of the operator; and estimating, by an intention estimation part, from the environment sensor value and the operator sensor value, an intention of the operator based on a probability distribution calculated from a gaze point of the operator in a robot world and a trajectory of a hand of the operator in the robot world.

According to another aspect of the invention, a non-transitory computer readable medium storing a program is provided. In a robot remote operation which recognizes a movement of an operator and transmits the movement of the operator to a robot to operate the robot, the program causes a computer to: acquire an environment sensor value acquired by an environment sensor provided in the robot or a surrounding environment of the robot and an operator sensor value detecting the movement of the operator; and estimate, from the environment sensor value and the operator sensor value, an intention of the operator based on a probability distribution calculated from a gaze point of the operator in a robot world and a trajectory of a hand of the operator in the robot world.

BRIEF DESCRIPTION OF THE DRAWINGS

FIG. 8 is a flowchart illustrating processing procedures of a robot remote operation control device according to the second embodiment.

Figure 1:
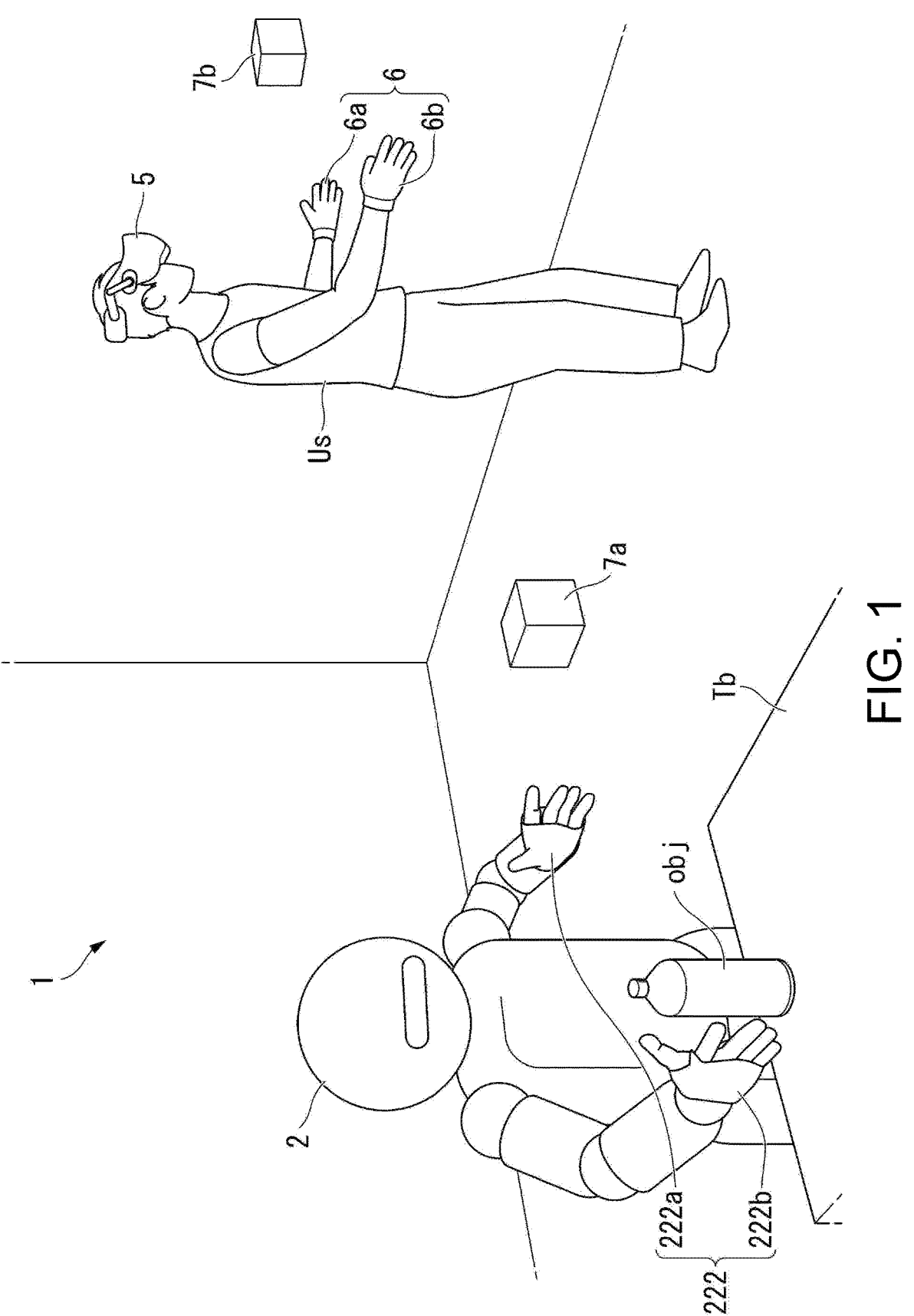
FIG. 1 is a view outlining a robot remote operation control system and the work according to an embodiment.

DESCRIPTION OF THE EMBODIMENTS (1) In order to achieve the objective, an aspect of the invention provides a robot remote operation control device.

In a robot remote operation which recognizes a movement of an operator and transmits the movement of the operator to a robot to operate the robot, the robot remote operation control device includes: an information acquisition part, acquiring an environment sensor value acquired by an environment sensor provided in the robot or a surrounding environment of the robot and an operator sensor value, which is information indicating the movement of the operator that is detected; and an intention estimation part, estimating a motion of the operator, which is a motion instruction with respect to the robot, by using a trained model from the operator sensor value.

(2) In addition, in the robot remote operation control device according to an aspect of the invention, the information acquisition part may acquire the environment sensor value acquired by the environment sensor provided in the robot or in the surrounding environment of the robot, and the intention estimation part may perform estimation on whether the operator is to operate the robot to perform alignment on a gripped object gripped by the robot by using a trained model from the environment sensor value and the operator sensor value, and generate a control command value for driving the robot based on a result of the estimation.

(3) In addition, in the robot remote operation control device according to an aspect of the invention, the information acquisition part may acquire the environment sensor value acquired by the environment sensor provided in the robot or in the surrounding environment of the robot, and the intention estimation part may calculate a likelihood on at which posture the operator is to perform alignment with respect to the gripped object by using the environment sensor value and the operator sensor value, and perform alignment support.

(4) In addition, in the robot remote operation control device according to an aspect of the invention, the intention estimation part may calculate the likelihood with respect to the gripped object by the operator after a process that performs estimation from the operator sensor value and stabilizes a value.

(5) In addition, in the robot remote operation control device according to an aspect of the invention, the information acquisition part may acquire the environment sensor value acquired by the environment sensor provided in the robot or in the surrounding environment of the robot, and the intention estimation part also inputs the environment sensor value to the trained model and estimates the motion of the operator which is the motion instruction with respect to the robot.

(6) In addition, in the robot remote operation control device according to an aspect of the invention, the intention estimation part performs estimation by extracting a feature amount from the operator sensor value, and classifies the motion of the operator, which is the motion instruction with respect to the robot, based on the extracted feature amount.

(7) In order to achieve the objective, an aspect of the invention provides a robot remote operation control system. The robot remote operation control system includes: an operator motion estimation device at the remote operation according to any one of (1) to (6). In the robot remote operation which recognizes the movement of the operator and transmits the movement of the operator to the robot to operate the robot, the robot remote operation control system includes: the environment sensor, provided in the robot or the surrounding environment of the robot and detecting a robot environment sensor value; the operator sensor, detecting the movement of the operator as the operator sensor value; and an image display device, displaying an image of a robot environment, which is in a field of view of the operator.

(8) In order to achieve the objective, an aspect of the invention provides a robot remote operation control method. In a robot remote operation which recognizes a movement of an operator and transmits the movement of the operator to a robot to operate the robot, the robot remote operation control method includes: acquiring, by an information acquisition part, an operator sensor value, which is information indicating the movement of the operator that is detected; and estimating, by an intention estimation part, a motion of the operator, which is a motion instruction with respect to the robot, by using a trained model from the operator sensor value.

(9) In order to achieve the objective, an aspect of the invention provides program. In a robot remote operation which recognizes a movement of an operator and transmits the movement of the operator to a robot to operate the robot, the program causes a computer to: acquire an operator sensor value which detects the movement of the operator; and estimate a motion of the operator, which is a motion instruction with respect to the robot, by using a trained model from the operator sensor value.

(10) In order to achieve the objective, an aspect of the invention provides a robot remote operation control device. In a robot remote operation which recognizes a movement of an operator and transmits the movement of the operator to a robot to operate the robot, the robot remote operation control device includes: an information acquisition part, acquiring an environment sensor value acquired by an environment sensor provided in the robot or a surrounding environment of the robot and an operator sensor value detecting the movement of the operator; and an intention estimation part, estimating, from the environment sensor value and the operator sensor value, an intention of the operator based on a probability distribution calculated from a gaze point of the operator in a robot world and a trajectory of a hand of the operator in the robot world.

(11) In addition, in the robot remote operation control device according to an aspect of the invention, the probability distribution may be a probability distribution based on distances between the gaze point of the operator and objects as operation candidates in the robot world and distances between a location of the hand of the operator and the objects in the robot world.

(12) In addition, in the robot remote operation control device according to an aspect of the invention, the probability distribution may be a probability distribution based on the trajectory of the hand of the operator in the robot world.

(13) In addition, in the robot remote operation control device according to an aspect of the invention, the probability distribution may be a probability distribution based on numbers of times that the gaze point of the operator is overlapped with the objects as the operation candidates.

(14) In addition, in the robot remote operation control device according to an aspect of the invention, in a case of multiple probability distributions, the intention estimation part may weigh and add the respective probability distributions based on the environment sensor value and the operator sensor value and calculates a sum, and estimate the intention of the operator based on the calculated sum of the probability distributions.

(15) In addition, in the robot remote operation control device according to an aspect of the invention, in a case of multiple probability distributions, the intention estimation part may calculate a sum after normalizing the probability distributions, and estimate the intention of the operator based on the calculated sum of the probability distributions.

(16) In order to achieve the objective, an aspect of the invention provides a robot remote operation control system. The robot remote operation control system includes: in a robot remote operation which recognizes a movement of an operator and transmits the movement of the operator to a robot to operate the robot, the robot remote operation control device according to any one of (10) to (15); a grip part, gripping an object; the environment sensor, provided in the robot or the surrounding environment of the robot and detecting a robot environment sensor value; the operator sensor, detecting the movement of the operator as the operator sensor value.

(17) In order to achieve the objective, an aspect of the invention provides a robot remote operation control method. In a robot remote operation which recognizes a movement of an operator and transmits the movement of the operator to a robot to operate the robot, the robot remote operation control method includes: acquire, by an information acquisition part, an environment sensor value acquired by an environment sensor provided in the robot or a surrounding environment of the robot and an operator sensor value detecting the movement of the operator; and estimating, by an intention estimation part, from the environment sensor value and the operator sensor value, an intention of the operator based on a probability distribution calculated from a gaze point of the operator in a robot world and a trajectory of a hand of the operator in the robot world.

(18) In order to achieve the objective, an aspect of the invention provides program. In a robot remote operation which recognizes a movement of an operator and transmits the movement of the operator to a robot to operate the robot, the program causes a computer to: acquire an environment sensor value acquired by an environment sensor provided in the robot or a surrounding environment of the robot and an operator sensor value detecting the movement of the operator; and estimate, from the environment sensor value and the operator sensor value, an intention of the operator based on a probability distribution calculated from a gaze point of the operator in a robot world and a trajectory of a hand of the operator in the robot world.

According to (1) to (9), what action the operator is taking can be estimated from the information acquired from the sensors wore on the body of the operator.

According to (2), by detecting the alignment intention of the operator and supporting alignment ahead of time, the time required for alignment can be reduced.

According to (3) and (4), by performing probabilistic calculation on at which angle the operator Places the gripped object, the support for Place is carried out, and the time and the stress required for the operator to perform alignment can be reduced.

According to (4), the influence of hand shaking can be reduced.

According to (10) to (18), the operation target object of Pick, Place, etc., can be estimated with high performance by drawing comprehensive inference through use of line of sight and hand movement.

In the following, the embodiments of the invention will be described with reference to the drawings. In the drawings for the following description, in order to make the respective components recognizable, the scale of the respective components has been changed as appropriate.

[Outline]

First of all, the outline of the work and the processes performed by an operator motion estimation system during a remote operation is described.

FIG. 1 is a view outlining a robot remote operation control system 1 and the work according to the embodiment. As shown in FIG. 1, an operator Us wears, for example, a head mounted display (HMD) 5 and a controller 6, for example. In a work space, an environment sensor 7a and an environment sensor 7b are provided. The environment sensors 7 may also be attached to the robot 2. In addition, the robot 2 includes gripping parts 222 (222a, 222b). The environment sensors 7 (7a, 7b) include, for example, an RGB camera and a depth sensor, as will be described in the following. The operator Us remotely operates the robot 2 by moving a hand or a finger wearing the controller 6 while viewing an image displayed on the HMDS. In addition, by making comprehensive estimation using the line of sight and the hand movement of the operator, a target object obj of an operation such as Pick & Place can be estimated with high performance.

In the embodiment, for example, by using a machine learning method, what action the operator is taking is estimated from multiple sensor values detected by multiple sensors worn by the operator. In addition, in the embodiment, how probable it is that the operator may perform alignment (take action) with respect to an object is calculated, and alignment support is realized. Also, in the embodiment, by using a machine learning method, for example, whether the operator is to perform alignment is estimated, before the operator perform alignment with respect to the object, from the multiple sensor values and the state of the operator motion estimation device system at the time of the remote operation.

Configuration Example of Robot Remote Operation Control System

In the following, a configuration example of the robot remote operation control system 1 is described.

Figure 2:
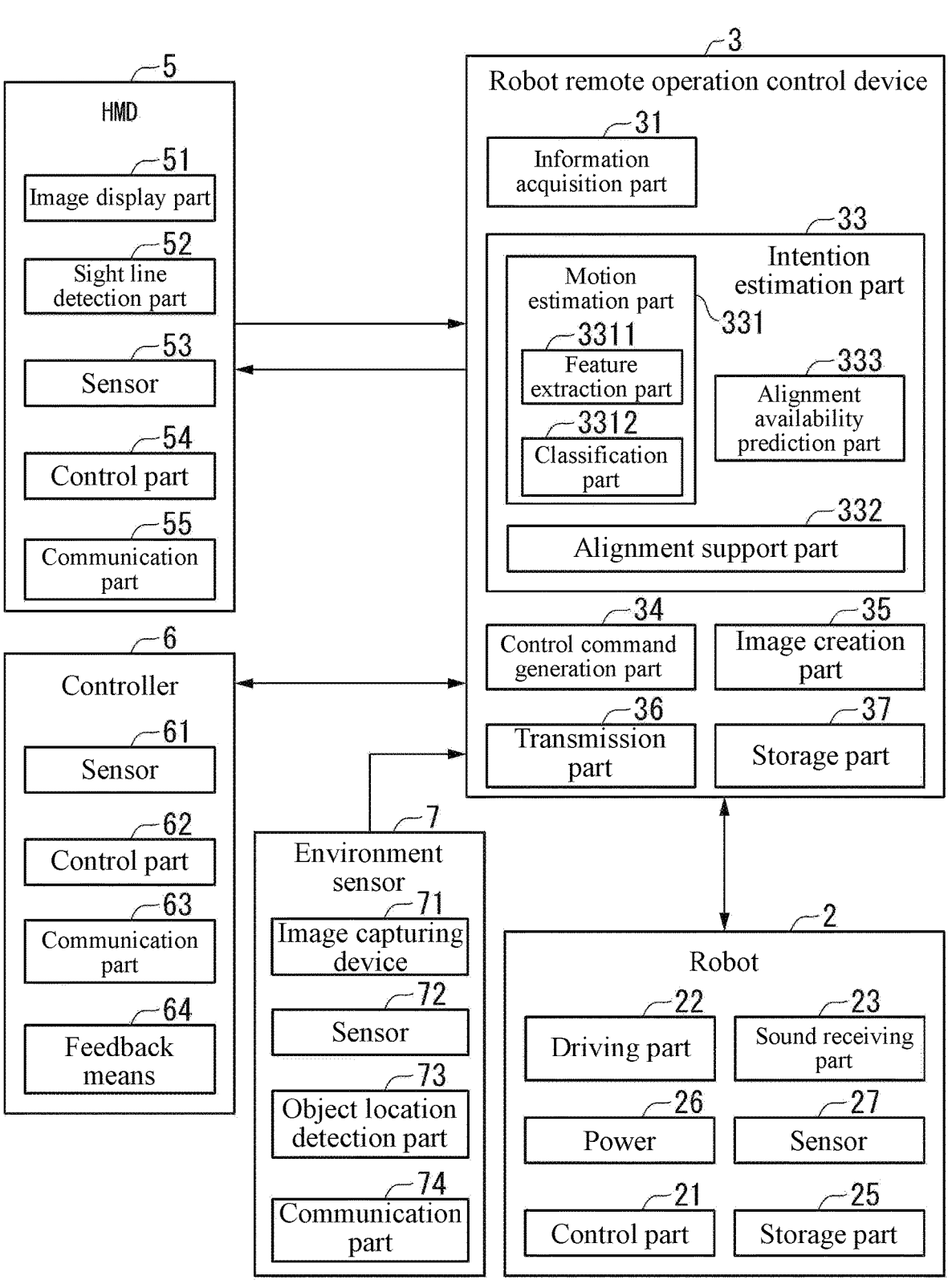
FIG. 2 is a block diagram illustrating a configuration example of the robot remote operation control system according to the embodiment.

FIG. 2 is a block diagram illustrating a configuration example of the robot remote operation control system 1 according to the embodiment. As shown in FIG. 2, the robot remote operation control system 1 includes a robot 2, a robot remote operation control device 3, the HMD 5 (image display device), the controller 6, and the environment sensor 7.

The robot 2, for example, includes a control part 21, a driving part 22, a sound receiving part 23, a storage part 25, a power 26, and a sensor 27.

The robot remote operation control device 3, for example, includes an information acquisition part 31, an intention estimation part 33, a control command generation part 34, an image creation part 35, a transmission part 36, and a storage part 37.

The intention estimation part 33 includes a motion estimation part 331, an alignment support part 332, and an alignment availability prediction part 333.

The motion estimation part 331 includes a feature amount extraction part 3311 and a classification part 3312.

The HMD 5 includes an image display part 51, a sight line detection part 52 (operator sensor), a sensor 53 (operator sensor), a control part 54, and a communication part 55. The HMD 5, for example, may also include a sensor for detecting the movement of the line of sight of the operator, etc.

The controller 6, for example, includes a sensor 61 (operator sensor), a control part 62, a communication part 63, and a feedback means 64.

The environment sensor 7, for example, includes an image capturing device 71, a sensor 72, an object position detection part 73, and a communication part 74.

The robot remote operation control device 3 and the HMD 5 are connected via a wireless or wired network, for example. The robot remote operation control device 3 and the controller 6 are connected via a wireless or wired network, for example. The robot remote operation control device 3 and the environment sensor 7 are connected via a wireless or wired network, for example. The robot remote operation control device 3 and the robot 2 are connected via a wireless or wired network, for example. The robot remote operation control device 3 and the HMD 5 may also be directly connected without via a network. The robot remote operation control device 3 and the controller 6 may also be directly connected without via a network. The robot remote operation control device 2 and the environment sensor 7 may also be directly connected without via a network. The robot remote operation control device 3 and the robot 2 may also be directly connected without via a network.

Functional Example of Robot Remote Operation Control System

In the following, a functional example of the robot remote operation control system is described with reference to FIG. 1.

The HMD 5 displays a state image of the robot received from the robot remote operation control device 3. The HMD 5 detects the movement of the sight line of the operator, the movement (rotation, tilting) of the head of the operator, etc., and transmits the detected operator sensor values to the robot remote operation control device 3.

The image display part 51 displays a state image of the robot received from the robot remote operation control device 3 in accordance with the control of the control part 54.

The sight line detection part 52 detects the line of slight of the operator, and outputs the detected operator sensor value (sight line information) to the control part 54. The sight line information is a sight line vector.

The sensor 53 detects the tilting of the head, the rotation of the head of the operator, and outputs the detected operator sensor value to the control part 54.

The control part 54 transmits the operator sensor values detected by the sight line detection part 52 and the sensor 53 to the robot remote operation control device 3 via the communication part 55. The control part 54 displays the robot state image transmitted by the robot remote operation control device 3 on the image display part 51.

The communication part 55 receives the robot state image transmitted by the robot remote operation control device 3, and outputs the received robot state image to the control part 54. The communication part 55 transmits the operator sensor values to the robot remote operation control device 3 in accordance with the control of the control part 54.

The controller 6, for example, is a touch sensation data glove worn on the hand of the operator. The controller 6 detects the orientation or the movement of each finger or the movement of the hand by the sensor 61, and transmits the detected hand motion information (operator sensor value) to the robot remote operation control device 3.

The sensor 61 is, for example, an acceleration sensor, a gyroscope sensor, a magnetic force sensor, etc. The sensor 61 may include multiple sensors 61, and the sensors 61 track the motions of the respective fingers by using two sensors, for example. The sensor 61 detects the movement of each finger or the hand movement, and outputs the detected hand motion information (operator sensor value) to the control part 62.

The control part 62 transmits the hand motion information detected by the sensor 61 to the robot remote operation control device 3 via the communication part 63. The control part 62 controls the feedback means 64 based on feedback information.

The communication part 63 transmits the operator motion information to the robot remote operation control device 3 in accordance with the control of the control part 62. The communication part 63 acquires the feedback information transmitted by the robot remote operation control device 3, and outputs the acquired feedback information to the control part 62.

The feedback means 64 feeds the feedback information back to the operator in accordance with the control of the control part 62. In accordance with the feedback information, the feedback means 64, for example, feeds a sensation back to the operator by a vibration application means (not shown), an air pressure application means (not shown), a hand movement restraining means (not shown), a temperature sensing means (not shown), a firmness/softness sensing means (not shown), etc., attached to the gripping part 222 of the robot 2.

The environment sensor 7 is provided at a location able to capture an image of and/or detect the work of the robot 2, for example. The environment sensor 7 may be provided in the robot 2, and may also be attached to the robot 2. In addition, there may be two or more environment sensors 7. The environment sensor 7 detects the location information of an object based on a captured image and the detection result detected by a sensor, and transmits the location information of the detected object (environment sensor value) to the robot remote operation control device 3.

The image capturing device 71, for example, is an RGB camera. The image capturing device 71 outputs the captured image to the object location detection part 73. In the environment sensor 7, the position relationship between the image capturing device 71 and the sensor 72 is known.

The sensor 72, for example, is a depth sensor. The sensor 72 outputs the detection result to the object location detection part 73. The image capturing device 71 and the sensor 72 may also be distance sensors.

The object location detection part 73 detects, by using a conventional method, a three-dimensional position, the size, the shape, etc., of the target object in the captured image based on the captured image and the detection result detected by the sensor. The object location detection part 73 refers to a pattern matching model, etc., stored in the object location detection part 73 to perform an image process (edge detection, binary process, feature amount extraction, image enhancement process, image extraction, pattern matching process, etc.) with respect to the image captured by the image capturing device 71 and estimate the location of the object. In the case of detecting multiple objects from the captured image, the object location detection part 73 detects the location of each object. The object location detection part 73 transmits the detected object location information (environment sensor value) to the robot remote operation control device 3 via the communication part 74.

The communication part 74 transmits the object location information to the robot remote operation control device 3.

The data transmitted by the environment sensor 7 may also be a point group having location information, for example.

In the case where the robot 2 is not operated remotely, the action of the robot 2 is controlled in accordance with the control of the control part 2. In the case where the robot 2 is operated remotely, the action of the robot 2 is controlled in accordance with a motion command generated by the robot remote operation control device 3.

The control part 21 controls the driving part 22 based on the control command output by the robot remote operation control device 3. The control part 21 may also perform a sound recognition process (utterance section detection, sound source separation, sound source localization, noise suppression, sound source identification, etc.) with respect to an acoustic signal received by the sound receiving part 23. The control part 21 generates feedback information, and transmits the generated feedback information to the controller 6 via the robot remote operation control device 3.

The driving part 22 drives the respective parts (gripping part 222, arm, finger, foot, head, torso, waist, etc.) of the robot 2 in accordance with the control of the control part 21. The driving part 22, for example, includes actuators, gears, artificial muscles, etc.

The sound receiving part 23, for example, is a microphone array including multiple microphones. The sound receiving part 23 outputs the received acoustic signal to the control part 21. The sound receiving part 23 may also be provided with a sound recognition processing function. In such case, the sound receiving part 23 outputs the sound recognition result to the control part 21.

The storage part 25, for example, stores a program, a threshold, etc., used in the control exerted by the control part 21, and temporarily stores the sound recognition result, the image processing result, and the control command, etc. The storage part 25 may also serve as the storage part 37. Alternatively, the storage part 37 may also serve as the storage part 25.

The power 26 supplies power to the respective parts of the robot 2. The power 26, for example, may include a rechargeable battery and a charging circuit.

The sensor 27, for example, may be an accelerator sensor, a gyroscope sensor, a magnetic force sensor, an encoder for each joint, etc. The sensors 27 are attached to the respective joints and the head, etc., of the robot 2. The sensor 27 outputs the detected detection result to the control part 21, the intention estimation part 33, the control command generation part 34, and the image creation part 35.

The robot remote operation control device 3 estimates the intention of the action or motion which the operator is performing for remotely operating the robot 2 based on the operator sensor value (e.g., sight line information) detected by the HMD 5, the operator sensor value (e.g., the hand motion information) detected by the controller 6, and the environment sensor value (e.g., the object location information) detected by the environment sensor 7, and generates the control command of the robot 2.

The information acquisition part 31 acquires the operator sensor value from the HMD 5, acquires the operator sensor value from the controller 6, and acquires the environment sensor value from the environment sensor 7. The information acquisition part 31 outputs the acquired operator sensor value and environment sensor value to the intention estimation part 33. In the following description, the sight line information (operator sensor value), the hand motion information (operator sensor value), and the object location information (environment sensor value) are referred to as sensor values.

The intention estimation part 33 estimates the object as a work target and the location thereof. In addition, the intention estimation part 33 estimates the information (the name, the location, the size, etc., of the target object) relating to the intended target object of the operator based on the sight line information, the hand motion information, and the object location information acquired by the information acquisition part 31. In the case where there are multiple objects in the work space, the intention estimation part 33 estimates the probability of being the target object for each object. The intention of the operator and the estimation method will be described in the following.

The feature amount extraction part 3311 extracts a feature amount based on the acquired operator sensor value and environment sensor value.

The classification part 3312 classifies the action of the operator based on the extracted feature amount. The classified action will be described in the following.

The alignment support part 332 calculates how probable it is that the operator is to perform alignment on the gripped object with respect to an alignment reference object, and realizes alignment support.

The alignment availability prediction part 333 makes a prediction in advance on whether the operator is to perform alignment at a stage in which the operator holds an object in hand and is reaching to an arbitrary object by using the information acquired from the operator sensor values. The alignment availability prediction part 333 may make a prediction at a time point prior to the alignment with respect to the object is performed, or prior to release of an object.

The control command generation part 34 generates a control command for gripping an object, for example, based on the result estimated by the intention estimation part 33, the detection result detected by the sensor 27, the environment sensor value sensed by the environment sensor 7. The control command generation part 34 outputs the generated control command information to the control part 21.

The image creation part 35 creates a robot state image displayed on the HMD 5 based on the control command information generated by the control command generation part 34.

The transmission part 36 transmits the robot state image created by the image creation part 35 to the HMD 5. The transmission part 36 acquires the feedback information output by the robot 2 and transmits the acquired feedback information to the controller 6.

The storage part 37 stores a predetermined value and a trained model used by the intention estimation part 33. The storage part 37 stores the location relationship between the image capturing device 71 and the sensor 72 of the environment sensor 7 and stores a program used in controlling the robot remote operation control device 3. The program may also be provided in a client or a network.

State Example in which Operator Wears HMD 5 and Controller 6

Figure 3:
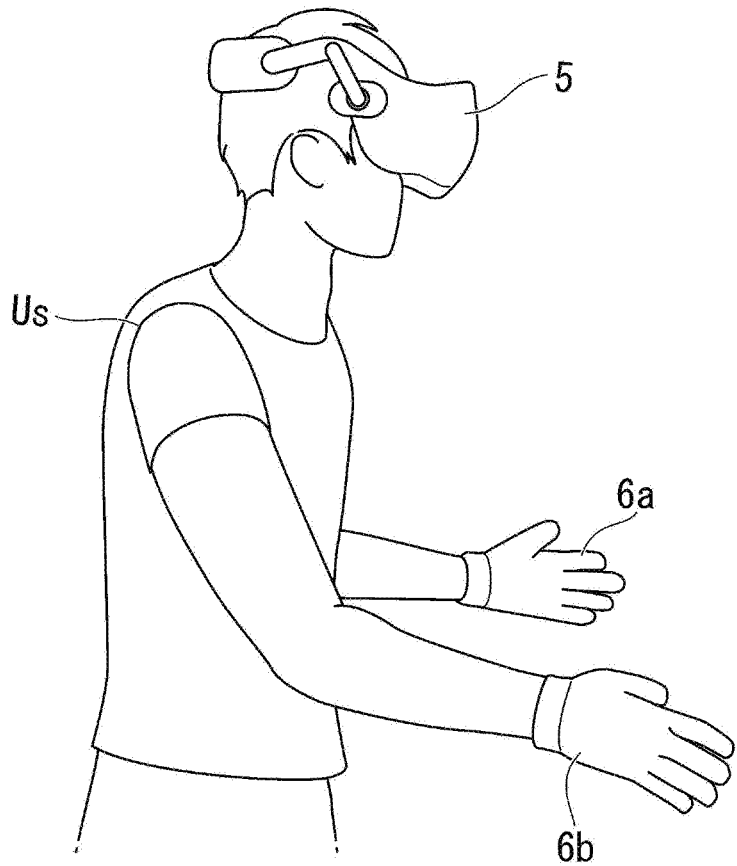
FIG. 3 is a view illustrating a state example in which the operator wears a HMD and a controller.

In the following, a state example in which the operator wears the HMD 5 and the controller 6. FIG. 3 is a view illustrating a state example in which the operator wears the HMD 5 and the controller 6. In the example of FIG. 3, the operator Us wears a controller 6a on the left hand, a controller 6b on the right hand, and the HMD 5 on the head. The HMD 5 and the controllers 6 shown in FIG. 3 are merely an example. The wearing methods, the shapes, etc., are not limited thereto.

First Embodiment

In the embodiment, for example, what action the operator is taking is estimated from multiple sensor values detected by multiple sensors worn by the operator.

Examples of Types of Classified Actions

First of all, the examples of the types of actions classified by the classification part 3312 will be described.

Figures 4, 5:
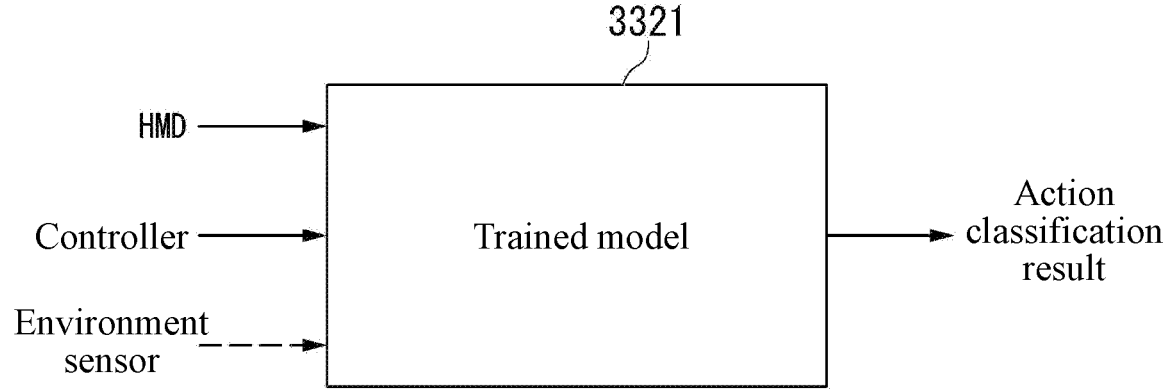
FIG. 4 is a diagram illustrating examples of types of actions classified by a classification part according to a first embodiment.
FIG. 5 is a diagram illustrating an example of a classification method of the classification part according to the first embodiment.

FIG. 4 is a diagram illustrating examples of types of actions classified by the classification part 3312 according to the embodiment. As shown in FIG. 4, the classification part 3312 classifies actions into four classes (first to fourth classes), for example. The classified operator actions are, for example, Reach, Grasp, Move, and Release. "Reach" is an action of bending the arm toward a location as the target. "Grasp" is an action of gripping an object. "Move" is an action of moving and carrying an object. "Release" is an action of releasing and placing a gripped object. The classification part 3312 may also classify other actions such as pinching.

Classification Example

In the following, an example of a classification method of the classification part 3312 will be described.

FIG. 5 is a diagram illustrating an example of a classification method of the classification part 3312 according to the embodiment. As shown in FIG. 5, the classification part 3312 inputs the operator sensor values acquired from at least the HMD 5 and the controller 6 to a trained model and acquires an output of the classification result of the action of the operator. In such case, it may also be that the feature amount extraction part 3311 does not extract feature amounts from the operator sensor values. The trained model is a model created by inputting operator sensor values, and performing training by using teacher data for the classification result of the action of the operator through a machine learning method (e.g., neural network). In addition, the trained model is stored in the classification part 3312 or the storage part 37. The machine learning method may also be a method (such as a decision tree-based method) other than neural network.

In the example shown in FIG. 5, an example in which the classification part 3312 inputs the operator sensor values to a trained model 3321 and obtains an output of the classification result of the action of the operator is described. However, the invention is not limited thereto. For example, the feature amount extraction part 3311 may also extract the feature amounts from the operator sensor values, and classify the action of the operator based on the feature amounts extracted by the classification part 3312.

The above describes an example in which the operator sensor values are used at the time of training and estimating. However, the invention is not limited thereto. The environment sensor value may also be used in the input at the time of learning and estimating.

[Processing Procedures]

In the following, the processing procedures of the robot remote operation control device 3 will be described.

Figure 6:
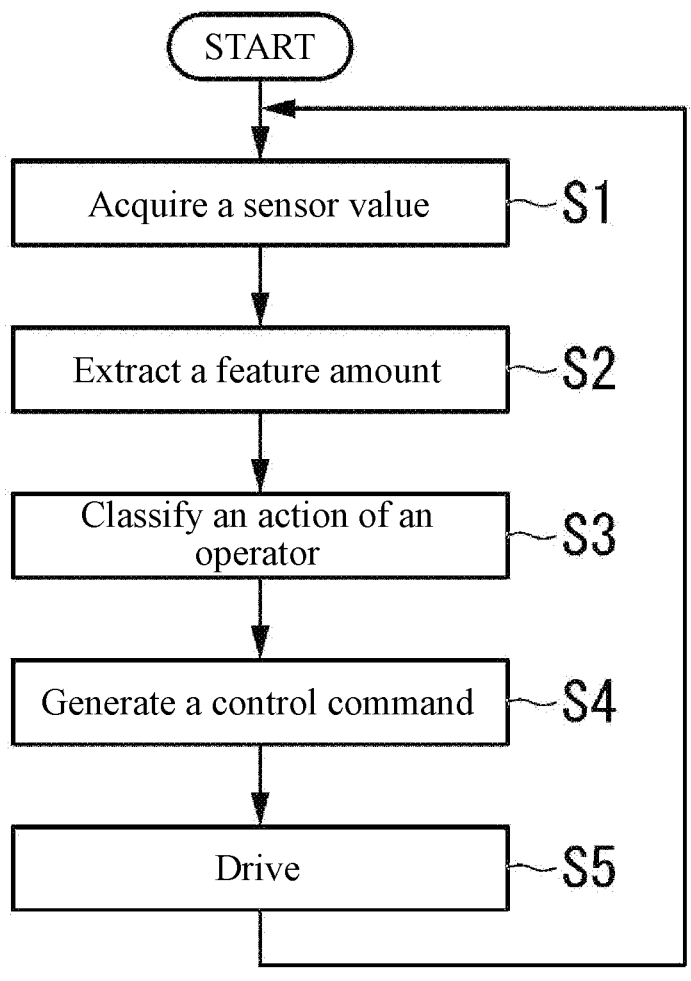
FIG. 6 is a flowchart illustrating processing procedures of a robot remote operation control device according to the first embodiment.

FIG. 6 is a flowchart illustrating processing procedures of the robot remote operation control device 3 according to the embodiment.

(Step S1) The information acquisition part 31 acquires the operator sensor value (sight line vector) from the HMD 5, acquires the operator sensor value from the controller 6, and acquires the environment sensor value from the environment sensor 7.

(Step S2) The feature amount extraction part 3311 extracts a feature amount from the operator sensor value.

(Step S3) The classification part 3312 classifies the action of the operator based on the extracted feature amount.

(Step S4) The control command generation part 34 generates a control command based on the action of the operator that is estimated.

(Step S5) The control part 21 controls the driving part 22 to drive the gripping part, etc., of the robot 2 based on the control command generated by the control command generation part 34. The control part 21 returns to the process of Step S1 after the process.

According to the above, in the embodiment, what action the operator is taking is classified by, for example, a trained model from multiple sensor values.

In this way, according to the embodiment, what action (Reach/Grasp/Move/Release) the operator is taking can be estimated from the information acquired from the sensors (the HMD 5, the controller 6) worn on the body of the operator. As a result, according to the embodiment, alignment can be supported ahead of time. In this way, according to the embodiment, the time required for alignment can be reduced.

It is also possible to make use of the action estimation result in alignment. In the case of predicting to perform alignment in the alignment availability estimation and the action estimation result is "Move", the robot remote operation control device 3 may, for example, implement control (fixing the movement of a specific axis in the robot arm) to support the alignment in Move.

Second Embodiment

In a remote operation, an operation of placing (referred to as alignment in the following) a gripped object next to an arbitrary object (referred to as an alignment reference object in the following) is difficult. In addition, it is difficult to directly estimate whether the operator performs alignment on the gripped object with respect to an object from the information acquired from the sensors worn on the body of the operator (sensors acquiring sight line, head rotation, location and angle of hand, etc.).

Therefore, in the embodiment, how likely (probability) and in which way the operator aligns the gripped object gripped by the operator with respect to the alignment reference object is calculated, and alignment support is realized.

Figure 7:
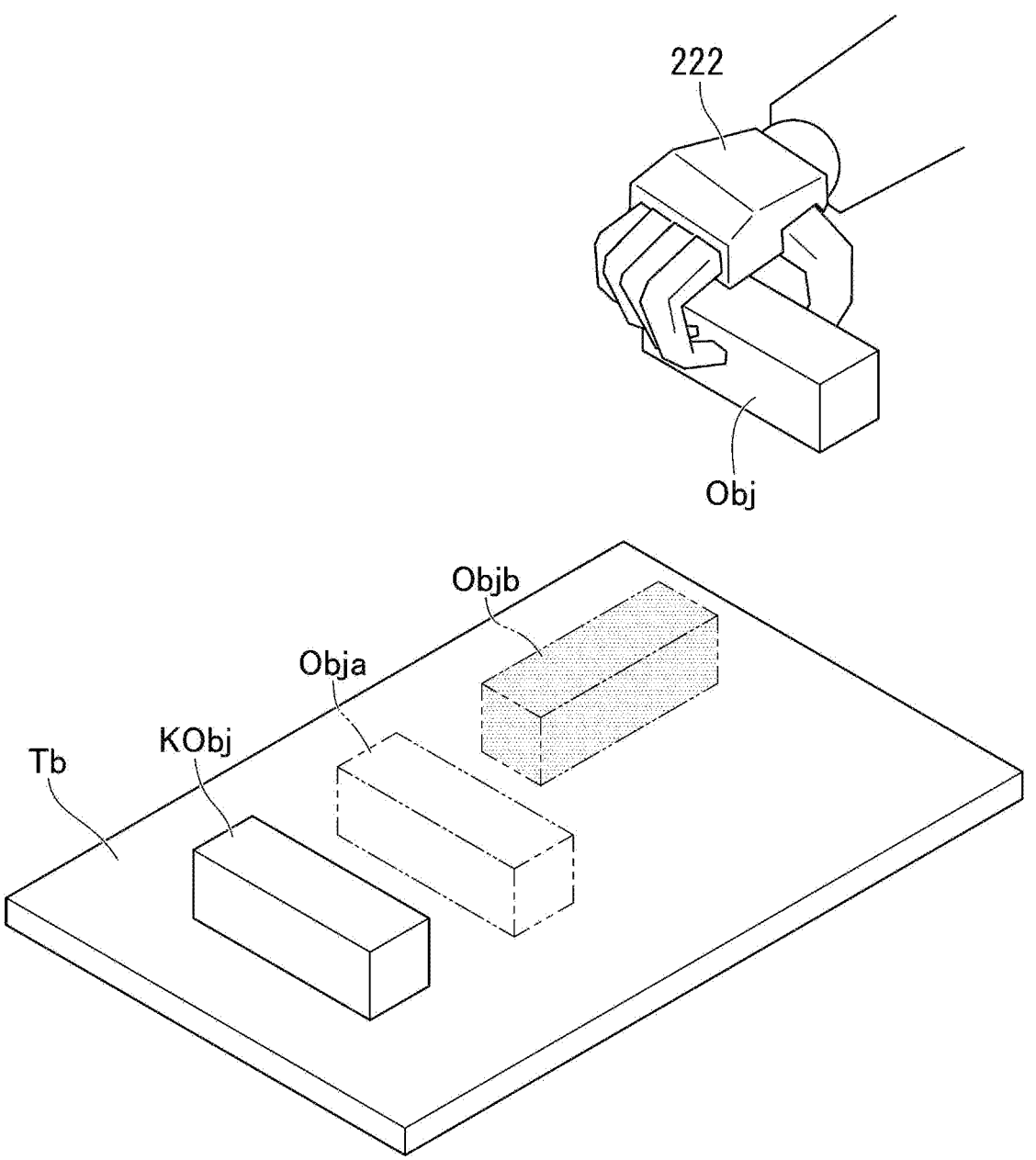
FIG. 7 is a view describing alignment support of a gripped object according to a second embodiment.

FIG. 7 is a view describing alignment support of a gripped object according to the embodiment. An alignment reference object KObj is an object already placed on a table Tb. A first placement candidate Obja is an example in which the longitudinal direction of the gripped object Obj is at the same angle (an angle set at 0 degrees) with the alignment reference object KObj. A second placement candidate Objb is an example in which the longitudinal direction of the gripped object Obj is at an angle of 90 degrees with respect to the alignment reference object KObj. The alignment reference object KObj may also be a virtual object.

The robot remote operation control device 3 generates in advance and maintains the placement candidates. The placement candidates shown in FIG. 6 are merely an example, and the invention is not limited thereto.

The robot remote operation control device 3 calculates the likelihood (probability) about in which state the gripped object Obj currently gripped is placed with respect to the alignment reference object KObj. In addition, the robot remote operation control device 3 supports alignment in accordance with the calculation result.

[Processing Procedures]

In the following, the processing procedures of the robot remote operation control device 3 will be described.

FIG. 8 is a flowchart illustrating processing procedures of the robot remote operation control device 3 according to the embodiment.

(Step S101) The information acquisition part 31 acquires the operator sensor value (sight line vector) from the HMD 5, acquires the operator sensor value from the controller 6, and acquires the environment sensor value from the environment sensor 7.

(Step S102) The alignment support part 332 detects the location and the placement of the alignment reference object KObj based on the acquired environment sensor value.

(Step S103) The alignment support part 332 detects the state of the gripped object gripped by the robot 2 through the remote operation of the operator based on the acquired operator sensor value and environment sensor value and the detection result detected by the sensor 27.

(Step S104) The alignment support part 332 generates gripped object placement candidates.

(Step S105) The alignment support part 332 calculates the likelihood (probability) of each placement candidate from the relative relationships between all the placement candidates and the state of the gripped object. An likelihood (probability) I is calculated with respect to a relative angle d $(-180°≤d≤180°)$ of the gripped object with an arbitrary placement candidate, for example, by using Formula (1) in the following:

$$1 = \exp(-k \cdot |d|) \tag{1}$$

In Formula (1), k is a constant that makes adjustment on how high the likelihood (probability) is calculated with respect to angle difference (size of relative angle). According to Formula (1), the smaller the relative angle with respect to the placement candidate of the gripped object, the higher the likelihood (probability).

The alignment support part 332, for example, calculates the likelihood (probability) based on the transition probability, etc., from the current gripped object to each placement candidate. In order to correct the hand shaking of the operator, the alignment support part 332 may also calculate the likelihood (probability) after a process (e.g., Kalman filter) that performs estimation from the acquired sensor values and stabilizes a value.

The posture of the gripped object is significantly affected by a hand posture. By performing posture estimation with respect to the posture of the gripped object by using Kalman filter, a posture more stable (less affected by hand shaking, etc.) than actual observation values can be output. In the embodiment, such value may also be used in generating a control command.

(Step S106) The control command generation part 34 generates the control command to support the placement of the placement candidate with the highest calculated likelihood (probability).

(Step S107) The control part 21 controls the driving part 22 to drive the gripping part, etc., of the robot 2 based on the control command generated by the control command generation part 34.

(Step S108) The control part 21 determines whether the gripped object is placed on a table, for example, in accordance with the remote operation of the operator. In the case where the control part 21 determines the gripped object is placed on the table (Step S108: YES), for example, the process is ended. In the case where the control part 21 determines the gripped object is not placed on the table (Step S108: NO), for example, the flow returns to the process of S101.

According to the above, in the embodiment, how likely (probability) and in which way the operator aligns the gripped object with respect to the alignment reference object is calculated, and alignment support is realized. The processing procedures are merely an example, and the invention is not limited thereto. For example, the order of the processes of Step S102 to Step S104 may also not be in this order, and the order of the processes may be changed. In these processes, for example, it may be that the process of Step S104 is performed after the process of Step S102, and then the process of Step S103 is performed. In these processes, for example, it may also be that the process of Step S102 is performed after the process of Step S103, and then the process of Step S104 is performed.

Thus, according to the embodiment, by performing probabilistic calculation on at which angle the operator releases (or Place) the gripped object, the support for Place is carried out, and the time and the stress required for the operator to perform alignment can be reduced.

It is noted that the embodiment may also be applied to the first embodiment.

Third Embodiment

When the gripped object is brought close to an arbitrary object (an object on a desk, for example) (holding an object and reaching), such as Pick and Place of an object through remote operation, the system cannot directly estimate whether the operator is to perform alignment on the gripped object with respect to the arbitrary object from the information (at each moment) acquired from the sensor (sensor for acquiring a line of sight, head rotation, location and angle of hand, etc.) worn on the body of the operator.

Therefore, in the embodiment, at the time when the operator releases the gripped object, whether alignment is to be performed is estimated, before the alignment with respect to the gripped object is performed prior to a release process, from multiple sensor values and the state of the robot remote operation control system.

Classification Example

In the following, an example of a classification method of the classification part 3312 will be described.

Figure 9:
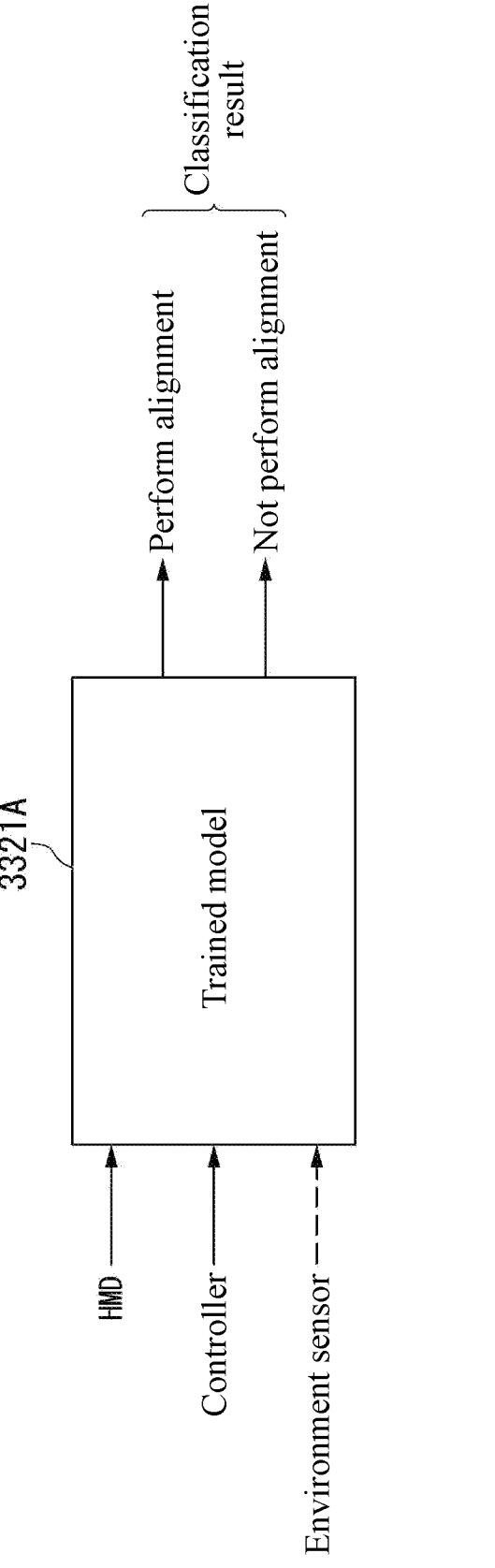
FIG. 9 is a diagram illustrating an example of a classification method of a classification part according to a third embodiment.

FIG. 9 is a diagram illustrating an example of a classification method of the classification part 3312 according to the embodiment. As shown in FIG. 9, the classification part 3312 inputs the operator sensor values acquired from at least the HMD 5 and the controller 6 to a trained model 3321A, and acquires an output of a classification result on whether to perform alignment. In such case, it may also be that the feature amount extraction part 3311 of the intention estimation part 33 does not extract feature amounts from the operator sensor values. The trained model 3321A is a model generated by inputting operator sensor values and training the model by using teacher data on whether to perform alignment through a machine learning method (e.g., neural network). In addition, the trained model 3321A is stored in the classification part 3312 or the storage part 37. The machine learning method may also be a method (such as a decision tree-based method) other than neural network.

In the example shown in FIG. 9, an example in which the classification part 3312 inputs the operator sensor values to the trained model 3321 and obtains an output of the classification result on whether to perform alignment is described. However, the invention is not limited thereto. For example, the feature amount extraction part 3311 may also extract feature amounts from the operator sensor values, and classify whether to perform alignment based on the feature amounts extracted by the classification part 3312.

The above describes an example in which the operator sensor values are used at the time of training and estimating. However, the invention is not limited thereto. The environment sensor value may also be used in the input at the time of learning and estimating.

[Processing Procedures]

In the following, the processing procedures of the robot remote operation control device 3 will be described.

Figure 10:
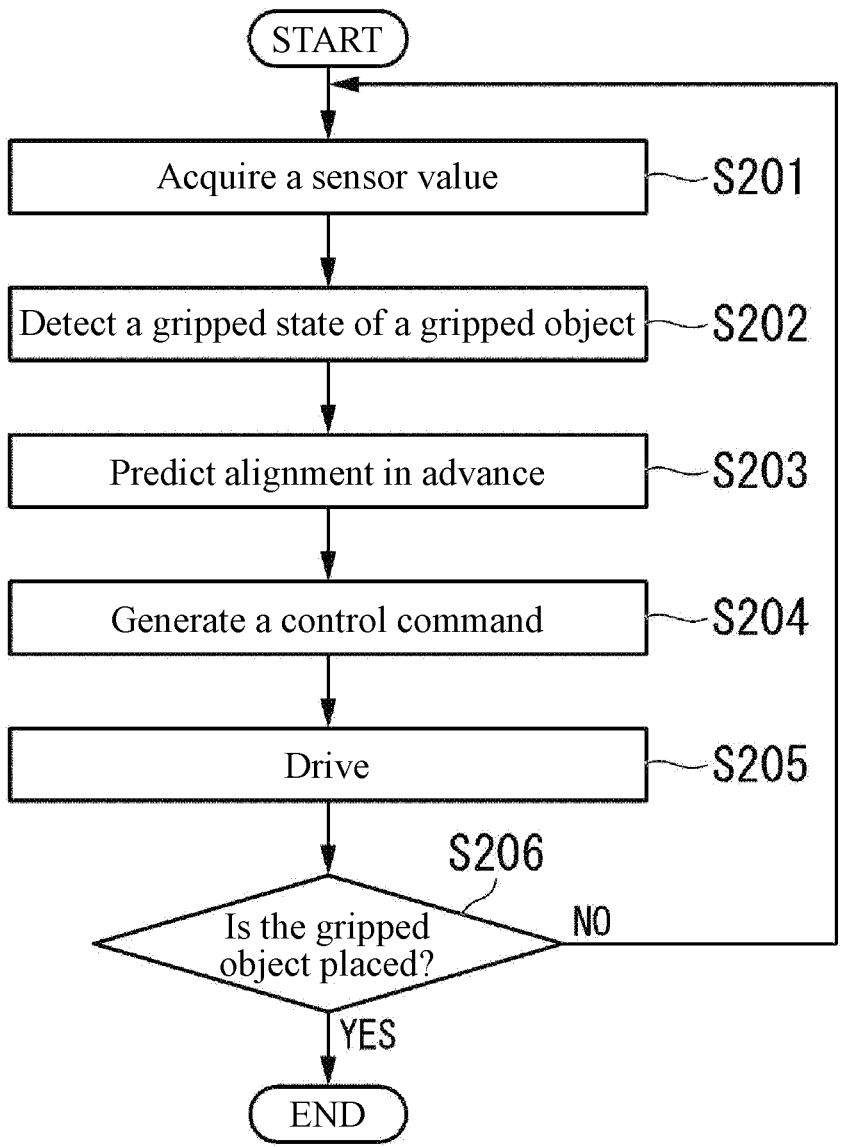
FIG. 10 is a flowchart illustrating processing procedures of a robot remote operation control device according to the third embodiment.

FIG. 10 is a flowchart illustrating processing procedures of the robot remote operation control device 3 according to the embodiment.

(Step S201) The information acquisition part 31 acquires the operator sensor value (sight line vector) from the HMD 5, acquires the operator sensor value from the controller 6, and acquires the environment sensor value from the environment sensor 7.

(Step S202) The alignment availability prediction part 333 detects the state of the gripped object gripped by the robot 2 through the remote operation of the operator based on the acquired operator sensor values and environment sensor value and the detection result detected by the sensor 27.

(Step S303) The alignment availability prediction part 333, for example, inputs the acquired operator sensor values to a trained learning model to make a prediction on alignment (whether to perform alignment) in advance.

(Step S204) The control command generation part 34 generates a control command based on the prediction result on whether to perform alignment.

(Step S205) The control part 21 controls the driving part 22 to drive the gripping part, etc., of the robot 2 based on the control command generated by the control command generation part 34.

(Step S206) The control part 21 determines whether the gripped object is placed on a table, for example, in accordance with the remote operation of the operator. In the case where the control part 21 determines the gripped object is placed on the table (Step S206: YES), for example, the process is ended. In the case where the control part 21 determines the gripped object is not placed on the table (Step S206: NO), for example, the flow returns to the process of S201.

According to the above, in the embodiment, a prediction is made in advance on whether to perform alignment at a stage in which the operator holds an object in hand and is reaching to an arbitrary object by using the information acquired from the sensors worn on the body of the operator. The alignment availability prediction part 333 may make a prediction at a time point prior to the alignment with respect to the object is performed, or prior to release of an object.

In this way, according to the embodiment, with the robot remote operation control device 3 detecting the alignment intention of the operator and supporting alignment ahead of time, the time required for alignment can be reduced.

It is noted that the embodiment is applicable to at least one of the first embodiment and the second embodiment.

Fourth Embodiment

Example of Intention Estimation Process

Figure 11:
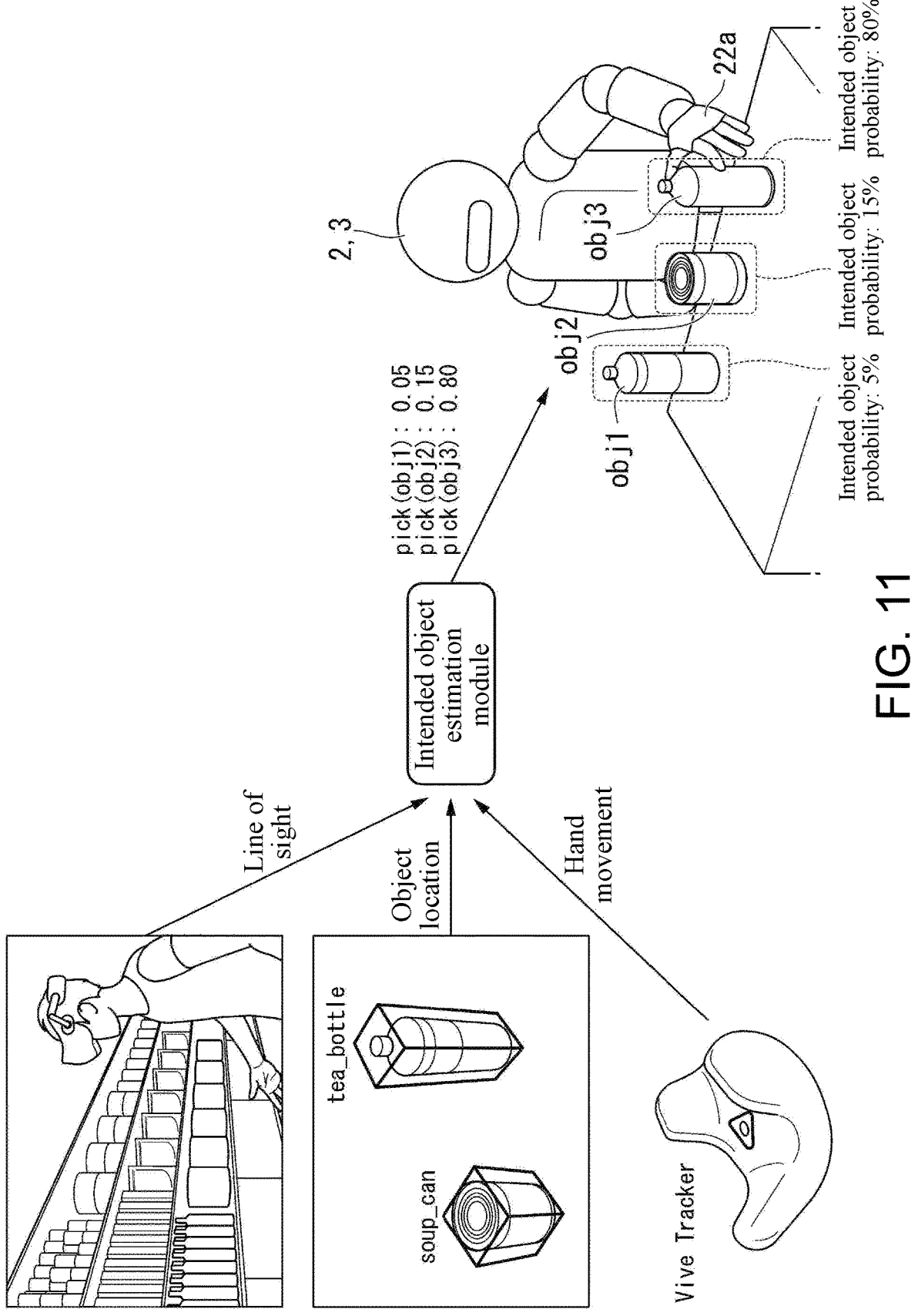
FIG. 11 is a schematic view illustrating an intention estimation process according to a fourth embodiment.

In the following, an intention estimation process is outlined. FIG. 11 is a schematic view illustrating an intention estimation process according to the embodiment.

As shown in FIG. 11, the robot remote operation control device 3 acquires the sight line information from the HMD 5, the hand motion information from the controller 6, and the object location information from the environment sensor 7.

The intention estimation part 33 estimates a gaze point of the operator in the robot world based on the sight line information. The intention estimation part 33 estimates the location of the hand of the operator in the robot world based on the hand motion information. The intention estimation part 33 calculates the distances between the gaze point and objects as operation candidates and the distances between the hand and the objects as operation candidates. The intention estimation part 33 calculates a probability distribution with respect to all the objects as operation candidates based on the calculated distances between the gaze point and the objects as operation candidates and the calculated distances between the hand and the objects as operation candidates.

The intention estimation part 33 detects a movement of the hand, that is, a trajectory of the hand of the operator, in the robot world based on the hand motion information. The intention estimation part 33 calculates a probability distribution with respect to all the objects as operation candidates based on the trajectory of the hand.

The intention estimation part 33 calculates a probability distribution with respect to all the objects as operation candidates based on the numbers of times that the gaze point is overlapped with the objects as operation candidates.

The intention estimation part 33 calculates a probability distribution based on Formula (1) in the following, for example.

[Formula 2]

$$b_t(g_t) \propto \prod_{\theta_t \in \theta_t} \propto P(\theta_t \mid g_t) \sum_{g_t \in g_{t-1}} P(g_t \mid g_{t-1}) b_{t-1}(g_{t-1}) \qquad (2)$$

In Formula (2), symbols in bold font represent vectors. "g" in bold font represents a set of intended objects which may be taken, "g" represents a random variable representing an intended object, and "bt(gt)" on the left represents a current intended object probability distribution. "bt–1" on the right represents the intention probability distribution at a previous moment "t–1", "P(gt|gt–1)" represents transition probability, "Π(θt|gt)" represents likelihood, and the relationship between observation values θ of hand and line of slight and an object g can be obtained (see Reference Document 1). The intention estimation part 33 may also calculate the probability distribution by using a formula for obtaining a probability distribution other than Formula (1).

The intention estimation part 33 weighs and adds the calculated probability distributions. In addition, the intention estimation part 33 estimates that the object with the highest probability in the weighted and added probability distribution as the intended object.

Reference Document 1: Siddarth Jain, Brenna Argall, "Recursive Bayesian Human Intent Recognition in Shared- Control Robotics", 2018 IEEE/RSJ International Conference on Intelligent Robots and Systems (IROS), p 3905-3912, 2018

In this way, in the embodiment, the intention estimation part 33 comprehensively estimates the intention of the operator by using the line of sight and the hand movement of the operator. It is noted that the intention estimation part may also input the hand movement information and the location information of the object on the table to a trained model and estimate the intention of the operator.

Example of Processing Procedures

In the following, the processing procedures of the robot remote operation control device 3 will be described.

Figure 12:
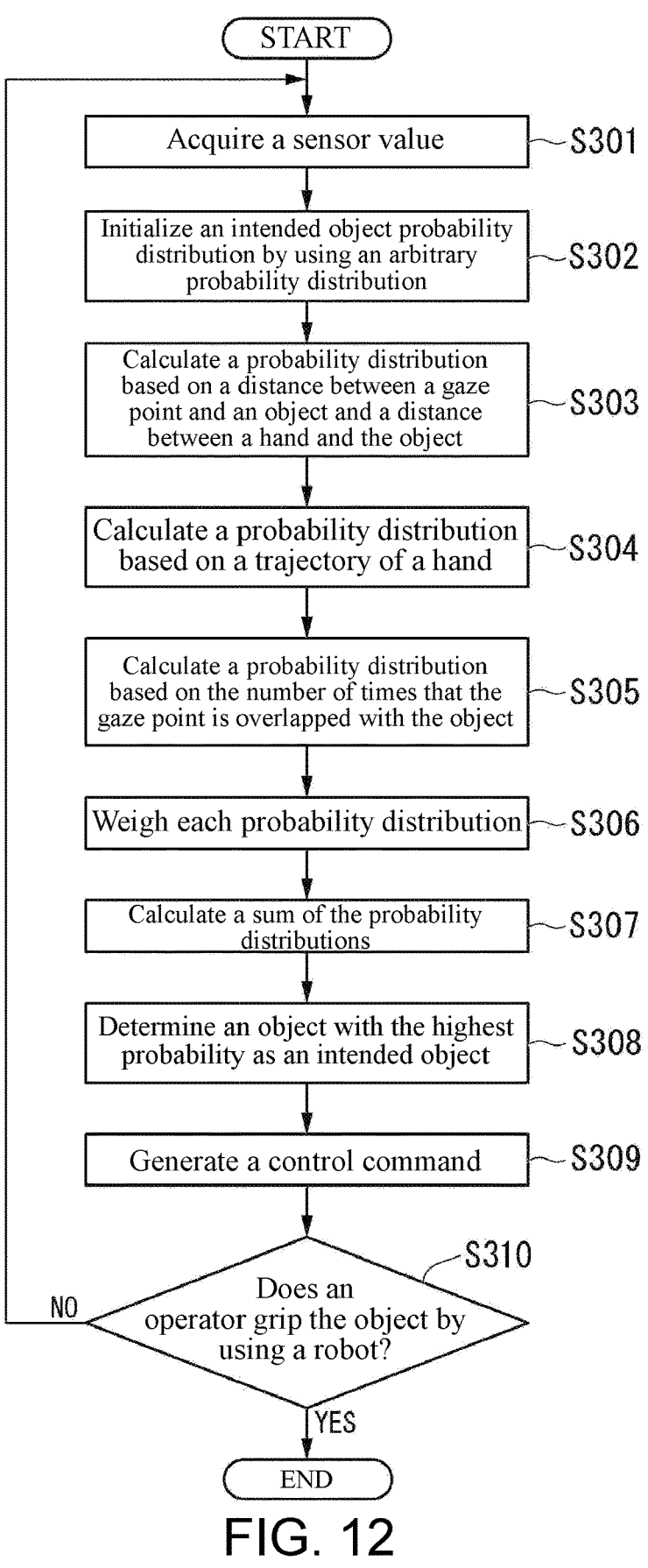
FIG. 12 is a flowchart illustrating processing procedures performed by a robot remote operation control device according to the fourth embodiment.

FIG. 12 is a flowchart illustrating an example of processing procedures performed by the robot remote operation control device 3 according to the embodiment.

(Step S301) The information acquisition part 31 acquires sensor values (sight line information, hand movement information, object location information).

(Step S302) The intention estimation part 33 initializes a probability distribution of the intended object, which is a target object to be gripped by the operator, for example, by using an arbitrary probability distribution. The arbitrary probability distribution may be, for example, a uniform distribution, a categorical distribution, etc.

(Step S303) The intention estimation part 33 calculates the distances between the gaze point of the operator and the objects as operation candidates in the robot world by using the acquired sensor values. Then, the intention estimation part 33 calculates the distances between the location of the hand of the operator and the objects as operation candidates in the robot world by using the acquired sensor value. Then, the intention estimation part 33 calculates a first probability distribution based on the distances between the gaze point of the operator and the objects as operation candidates and the distances between the location of the hand of the operator and the objects as operation candidates in the robot world.

(Step S304) The intention estimation part 33 calculates the trajectory of the hand of the operator in the robot world by using the acquired sensor value. Then, the intention estimation part 33 calculates a second probability distribution based on the trajectory of the hand of the operator in the robot world.

(Step S305) The intention estimation part 33 detects the numbers of times that the gaze point of the operator is overlapped with the objects as operation candidates in the robot world. Then, the intention estimation part 33 calculates a third probability distribution based on the numbers of times that the gaze point of the operator is overlapped with the objects as operation candidates.

(Step S306) The intention estimation part 33 performs weighting with respect to the first probability distribution, the second probability distribution, and the third probability distribution.

(Step S307) The intention estimation part 33 calculates a sum of the first probability distribution, the second probability distribution, and the third probability distribution. The process is performed by the intention estimation part 33 for each of the objects as operation candidates. Also, where necessary, the intention estimation part 33 may also calculate the sum after normalizing each probability distribution. Also, where necessary, the intention estimation part 33 may also calculate the sum by weighing the respective probability distributions.

(Step S308) The intention estimation part 33 determines, as the intended object, the object with the highest probability in the calculated probability distribution of the objects as operation candidates.

(Step S309) The control command operation part 34 generates the control command for gripping the intended object, for example, based on the result estimated by the intention estimation part 33 and the sensor value.

(Step S310) The intention estimation part 33 determines whether the operator grips the object, for example, by using the robot 2 based on the sensor value. In the case where the intention estimation part 33 determines that the operator grips the object, for example, by using the robot 2, the process is ended. In the case where the intention estimation part 33 determines that the operator does not grip the object, for example, by using the robot 2, the process returns to the process of Step S301.

Figure 13:
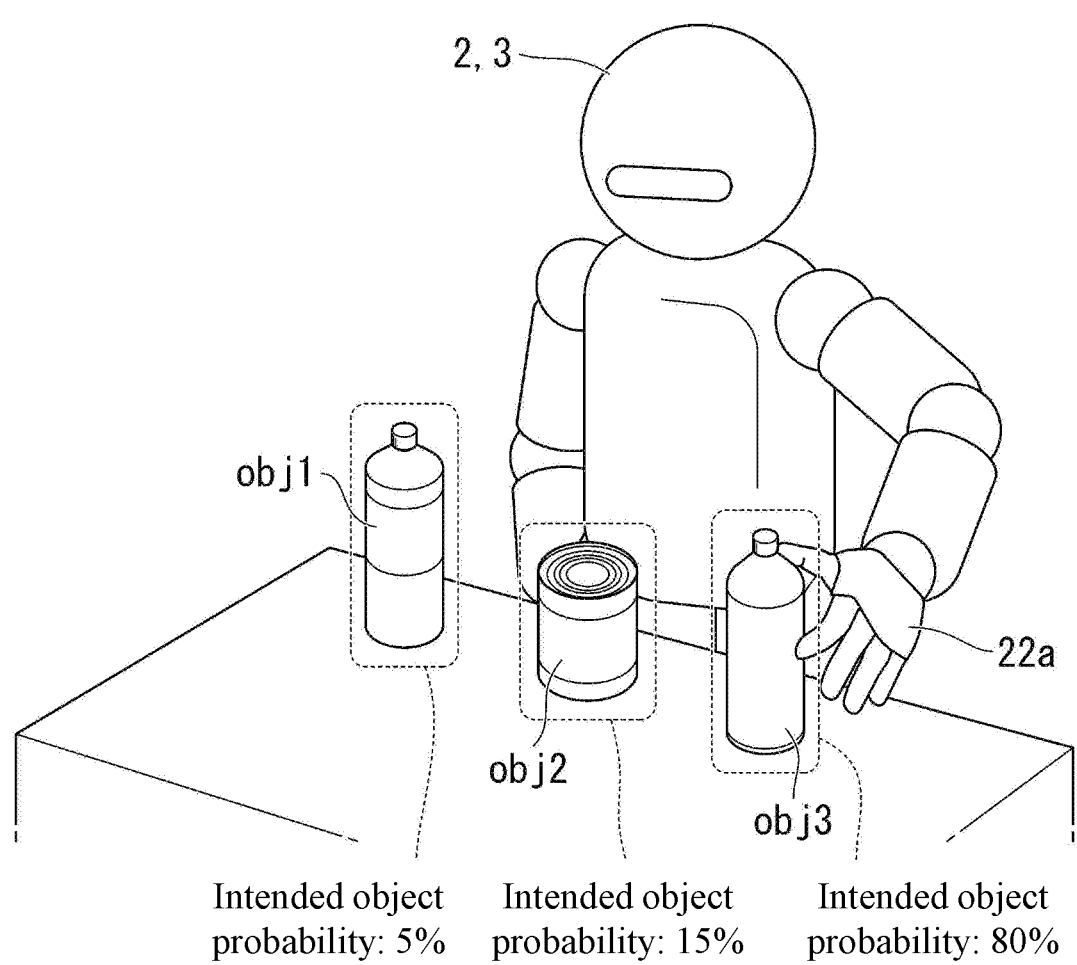
FIG. 13 is a schematic view illustrating an example of an intention estimation result according to the fourth embodiment.

It is noted that, in FIG. 13, the intention estimation part 33 may perform the processes of Steps S303 to S305 in parallel, in a time-division manner, or in a different process order.

Example of Intention Estimation Result

In the following, an example of the intention estimation result is described.

FIG. 13 is a schematic view illustrating an example of the intention estimation result according to the embodiment. FIG. 13 illustrates an example of a state in which three objects obj1 to obj3 are placed on a table, and the operator is to cause the robot 2 to grip the object obj3 with the left hand. The probabilities of the respective objects calculated by the intention estimation part 33 are as follows: the probability of the first object obj1 most distant from the grip part 222a of the left hand is 5%, the probability of the third object obj3 closest to the grip part 222a of the left hand is 80%, and the probability of the second object obj2 between the first object obj1 and the third object obj3 is 15%.

In this case, the intention estimation part 33 determines the third object obj3 with the highest probability as the intended object.

Example of Weighting

Here, an example of a method with which the intention estimation part 33 performs weighting with respect to the probability distributions is described.

For example, the intention estimation part 33 may perform weighting with respect to the probability distributions of all the objects based on the locations of the grip part 222 of the robot 2 and the respective objects by using the environment sensor value and the operator sensor value. For the weighting, for example, an experiment may be carried out in advance to verify a probability distribution which may be of high importance, and a distribution of high importance may be assigned a great weight. Also, for example, in the case where the probability distribution calculated from the line of sight is more accurate than the probability distribution calculated from the locations of the hand and the objects, the probability distribution calculated from the line of sight may also be assigned a greater weight.

In addition, the intention estimation part 33 may also perform weighing with respect to the probability distributions of all the objects based on the shape of the hand of the operator and the shapes of the respective objects by using the environment sensor value and the operator sensor value. For example, when the operator brings the hand close to an object, it is possible that the hand is expanded differently in the case where the operator is to grip a large object and the case where the operator is to grip a small object. Such shape of the hand of the operator may be associated with the object and stored in the storage part 37.

According to the above, in the embodiment, the intention of the operator is estimated based on the calculation on the probability distributions from the gaze point of the operator and the trajectory of the hand of the operator.

In this way, according to the embodiment, the operation target object of Pick, Place, etc., can be estimated with high performance by drawing comprehensive inference through use of line of sight and hand movement.

In the above example, the locations of objects are detected by the environment sensors 7 and transmitted to the robot remote operation control device. However, the invention is not limited thereto. For example, the intention estimation part 33 may also detect the location information of objects by using the sensor value acquired from the environment sensor 7.

The intention estimation part 33 may also predict in advance an intended future hand trajectory of the operator based on the state information of the robot 2.

In addition, since the coordinate system is different in the environment in which the operator performs operation and the robot motion environment, the robot remote operation control device 3, for example, may also perform calibration between the operation environment of the operator and the robot motion environment when the robot 2 is started, for example.

In addition, at the time of gripping, the robot remote operation control device 3 may also calibrate an error of the gripped location at the time of gripping and determine the gripped location based on the gripping force of the robot 2 and the friction between the object and the gripped part 222.

In addition, the robot 2 may be, for example, a bipedal waling robot, a fixed reception robot, or a work robot.

In the above example, the robot 2 performs gripping by carrying out a remote operation. However, the invention is not limited thereto.

Moreover, in the above example, the operator wears the HMD 5. However, the invention is not limited thereto. The detection of the sight line information, the provision of the robot state image to the operator, for example, may also be carried out through a combination of a sensor and an image display device.

It is noted that the entirety or a part of the process performed by the robot 2 and the entirety or a part of the process performed by the robot remote operation control device 3 may be performed by recording a program for realizing the entirety or a part of the function of the robot 2 or the entirety and a part of the function of the robot remote operation control device 3 according to the invention in a computer readable recording medium, and reading and executing the program recorded in the recording medium on a computer system. Here, the "computer system" refers to one including OS and hardware such as peripheral devices. In addition, the "computer system" also includes a system built on a local network, a system built on a client, etc. In addition, the "computer readable recording medium" refers to a portable medium such as a flexible disc, a magneto-optical device, a ROM, a CD-ROM, a storage device such as a hard disc built in a computer system. Furthermore, the "computer-readable recording medium" includes one keeping the program within a certain period of time, such as a volatile memory (RAM) inside a computer system serving as a server or a client in the case where the program is transmitted via a network such as the Internet or a communication line such as a telephone line.

In addition, the program may also be transmitted from a computer system in which the program is stored in a storage device, etc., to another computer system via a transmission medium or through transmission waves in the transmission medium. Here, the "transmission medium" transmitting the program refers to a medium having an information transmission function like a network (communication network) such as the Internet or a communication line such as a telephone line. In addition, the program may realize a part of the function. Furthermore, a so-called differential file (differential program) may be used, which can realize the function by combining programs already recorded in the computer system.

Although the embodiments for carrying out the invention have been described above using the embodiments, the invention is not limited to these embodiments. Various modifications and substitutions can be made without departing from the gist of the invention.

What is claimed is:

1. A robot remote operation control device, wherein in a robot remote operation which recognizes a movement of an operator and transmits the movement of the operator to a robot to operate the robot to grip an object, the robot remote operation control device comprises:

a processor, configured to perform acquiring an environment sensor value acquired by an environment sensor provided in the robot or a surrounding environment of the robot and an operator sensor value, which is information indicating the movement of the operator that is detected, from a head mounted display and a hand wear controller worn by the operator;

receiving the acquired environment sensor value and the acquired operator sensor value, and estimating a motion of the operator, which is a motion instruction with respect to the robot, by using a line of sight and a hand movement of the operator based on a trained model from the operator sensor value; and generating a control command for gripping the object based on an estimated result of the motion of the operator, the environment sensor value and the operator sensor value, and provide the control command to the robot, wherein the processor is configured to receive the acquired environment sensor value and the acquired operator sensor value, and estimating the motion of the operator, which is the motion instruction with respect to the robot, by using the line of sight and the hand movement of the operator based on a trained model from the operator sensor value-further comprises:

extracting a feature amount based on the operator sensor value and the environment sensor value and classifying an action of the operator based on the extracted feature amount, calculating a likelihood of an alignment between the object and an alignment reference object for each of a plurality of placement candidates to perform a placement of the object gripped by the robot by using the environment sensor value and the operator sensor value, performing an alignment support to perform the alignment during the placement by using a placement candidate of the plurality of placement candidates having a highest likelihood of the alignment between the object and the alignment reference object, and making a prediction in advance on whether the operator is to perform the alignment at a stage in which the operator holds the object in hand by using information acquired from the operator sensor value, wherein the alignment is an operation to align the gripped object with respect to the alignment reference object.

2. The robot remote operation control device as claimed in claim 1, wherein the environment sensor is provided in the robot or in the surrounding environment of the robot, and the processor is further configured to generate a control command value for driving the robot based on a result of the estimation.

3. The robot remote operation control device as claimed in claim 2, wherein the processor is configured to calculate a likelihood on at which posture the operator is to perform the alignment with respect to the object gripped by the robot by using the environment sensor value and the operator sensor value so as to perform the alignment support.

4. The robot remote operation control device as claimed in claim 3, wherein the processor is configured to calculate the likelihood of the alignment after a process that performs estimation from the operator sensor value to stabilize a value associated with the alignment.

5. The robot remote operation control device as claimed in claim 1, wherein the processor is configured to input the environment sensor value to the trained model and estimates the motion of the operator which is the motion instruction with respect to the robot.

6. The robot remote operation control device as claimed in claim 1, wherein the processor is configured to perform estimation by extracting a feature amount from the operator sensor value, and to classify the motion of the operator, which is the motion instruction with respect to the robot, based on the extracted feature amount.

7. A robot remote operation control system, comprising:

the robot remote operation control device as claimed in claim 1, wherein in the robot remote operation which recognizes the movement of the operator and transmits the movement of the operator to the robot to operate the robot, the robot remote operation control system comprises:

a grip part, gripping an object;

the environment sensor, provided in the robot or the surrounding environment of the robot and detecting the environment sensor value;

the operator sensor, detecting the movement of the operator as the operator sensor value; and an image display device, displaying an image of a robot environment, which is in a field of view of the operator.

8. A robot remote operation control method, wherein in a robot remote operation which recognizes a movement of an operator and transmits the movement of the operator to a robot to operate the robot to grip an object, the robot remote operation control method performed by a processor comprises:

acquiring an environment sensor value related to the robot or a surrounding environment of the robot;

acquiring an operator sensor value which detects the movement of the operator from a head mounted display and a hand wear controller worn by the operator;

estimating a motion of the operator, which is a motion instruction with respect to the robot, by using a line of sight and a hand movement of the operator based on a trained model from the operator sensor value;

generating a control command for gripping the object based on an estimated result of the motion of the operator, the environment sensor value and the operator sensor value, and provide the control command to the robot, wherein estimating the motion of the operator further comprises:

extracting a feature amount based on the operator sensor value and the environment sensor value and classifying an action of the operator based on the extracted feature amount;

calculating a likelihood of an alignment between the object and an alignment reference object for each of a plurality of placement candidates to perform a placement of the object gripped by the robot by using the environment sensor value and the operator sensor value;

performing an alignment support to perform the alignment during the placement by using a placement candidate of the plurality of placement candidates having a highest likelihood of the alignment between the object and the alignment reference object; and predicting in advance on whether the operator is to perform the alignment at a stage in which the operator holds the object in hand by using information acquired from the operator sensor value, wherein the alignment is an operation to align the gripped object with respect to the alignment reference object.

9. A non-transitory computer readable medium, storing a program, wherein in a robot remote operation which recognizes a movement of an operator and transmits the movement of the operator to a robot to operate the robot to grip an object, the program causes a computer to:

acquire an environment sensor value related to the robot or a surrounding environment of the robot;

acquire an operator sensor value, which is information indicating the movement of the operator that is detected from a head mounted display and a hand wear controller worn by the operator;

receive the environment sensor value and the operator sensor value to estimate a motion of the operator, which is a motion instruction with respect to the robot, by using a line of sight and a hand movement of the operator based on a trained model from the operator sensor value;

generate a control command for gripping the object based on an estimated result, the environment sensor value and the operator sensor value, and provide the control command to the robot;

wherein estimating the motion of the operator further comprises:

extracting a feature amount based on the operator sensor value and the environment sensor value and classifying an action of the operator based on the extracted feature amount;

calculating a likelihood of an alignment between the object and an alignment reference object for each of a plurality of placement candidates to perform a placement of the object gripped by the robot by using the environment sensor value and the operator sensor value;

performing an alignment support to perform the alignment during the placement by using a placement candidate of the plurality of placement candidates having a highest likelihood of the alignment between the object and the alignment reference object; and predicting in advance on whether the operator is to perform the alignment at a stage in which the operator holds the object in hand by using information acquired from the operator sensor value, wherein the alignment is an operation to align the gripped object with respect to the alignment reference object.

10. A robot remote operation control device, wherein in a robot remote operation which recognizes a movement of an operator and transmits the movement of the operator to a robot to operate the robot to grip an object, the robot remote operation control device comprises:

a processor, configured to perform acquiring an environment sensor value acquired by an environment sensor provided in the robot or a surrounding environment of the robot and an operator sensor value detecting the movement of the operator from a head mounted display and a hand wear controller worn by the operator;

receiving the environment sensor value and the operator sensor value to estimate an intention of the operator based on a probability distribution with respect to operation candidate objects calculated from a gaze point of the operator in a robot world and a trajectory of a hand of the operator in the robot world, wherein the processor is configured to perform receiving the environment sensor value and the operator sensor value to estimate the intention of the operator based on the probability distribution with respect to all the operation candidate objects calculated from the gaze point of the operator in the robot world and the trajectory of the hand of the operator in the robot world further includes:

estimating the gaze point based on a sight line information of the operator acquired from the head mounted display, and estimate a location of the hand of the operator in the robot world based on the hand motion information of the operator acquired from the hand wear controller, calculating first distances between the gaze point and the operation candidate objects and second distances between the hand and the operation candidate objects, and calculating the probability distribution with respect to all the operation candidate objects based on the first distances between the gaze point and the objects as operation candidates and the second distances between the hand and the objects as operation candidates, wherein the probability distribution is determined based on numbers of times that the gaze point of the operator is overlapped with the objects as the operation candidates.

11. The robot remote operation control device as claimed in claim 10, wherein the probability distribution is a probability distribution based on distances between the gaze point of the operator and object as operation candidates in the robot world and distances between a location of the hand of the operator and the objects in the robot world.

12. The robot remote operation control device as claimed in claim 10, wherein the probability distribution is a probability distribution based on the trajectory of the hand of the operator in the robot world.

13. The robot remote operation control device as claimed in claim 10, wherein the gaze point of the operator is completely overlapped with the objects as the operation candidates.

14. The robot remote operation control device as claimed in claim 10, wherein the processor, in a case of multiple probability distributions, is configured to weigh and add the respective probability distributions based on the environment sensor value and the operator sensor value and calculates a sum, and estimate the intention of the operator based on the calculated sum of the probability distributions.

15. The robot remote operation control device as claimed in claim 10, wherein the processor, in a case of multiple probability distributions, is configured to calculate a sum after normalizing the probability distributions, and estimate the intention of the operator based on the calculated sum of the probability distributions.

16. A robot remote operation control system, wherein in a robot remote operation which recognizes a movement of an operator and transmits the movement of the operator to a robot to operate the robot, the robot remote operation control system comprises:

the robot remote operation control device as claimed in claim 10, a grip part, provided on the robot to grip the object;

the environment sensor, provided in the robot or the surrounding environment of the robot and detecting a robot environment sensor value;

the operator sensor, detecting the movement of the operator as the operator sensor value.

17. A robot remote operation control method, wherein in a robot remote operation which recognizes a movement of an operator and transmits the movement of the operator to a robot to operate the robot to grip an object, the robot remote operation control method performed by a processor comprises:

acquiring an environment sensor value acquired by an environment sensor provided in the robot or a surrounding environment of the robot and an operator sensor value detecting the movement of the operator from a head mounted display and a hand wear controller worn by the operator;

receiving the environment sensor value and the operator sensor value to estimate an intention of the operator based on a probability distribution with respect to operation candidate objects calculated from a gaze point of the operator in a robot world and a trajectory of a hand of the operator in the robot world, wherein the processor is configured to perform receiving the environment sensor value and the operator sensor value to estimate the intention of the operator based on the probability distribution with respect to all the operation candidate objects calculated from the gaze point of the operator in the robot world and the trajectory of the hand of the operator in the robot world further includes:

estimating the gaze point based on a sight line information of the operator acquired from the head mounted display, and estimate a location of the hand of the operator in the robot world based on the hand motion information of the operator acquired from the hand wear controller, calculating first distances between the gaze point and the operation candidate objects and second distances between the hand and the operation candidate objects, and calculating the probability distribution with respect to all the operation candidate objects based on the first distances between the gaze point and the objects as operation candidates and the second distances between the hand and the objects as operation candidates, wherein the probability distribution is determined based on numbers of times that the gaze point of the operator is overlapped with the objects as the operation candidates.

18. A non-transitory computer readable medium, storing a program, wherein in a robot remote operation which recognizes a movement of an operator and transmits the movement of the operator to a robot to operate the robot to grip an object, the program causes a computer to:

acquire an environment sensor value acquired by an environment sensor provided in the robot or a surrounding environment of the robot and an operator sensor value detecting the movement of the operator from a head mounted display and a hand wear controller worn by the operator;

receiving the environment sensor value and the operator sensor value to estimate an intention of the operator based on a probability distribution with respect to operation candidate objects calculated from a gaze point of the operator in a robot world and a trajectory of a hand of the operator in the robot world, wherein the processor is configured to perform receiving the environment sensor value and the operator sensor value to estimate the intention of the operator based on the probability distribution with respect to all the operation candidate objects calculated from the gaze point of the operator in the robot world and the trajectory of the hand of the operator in the robot world further includes:

estimating the gaze point based on a sight line information of the operator acquired from the head mounted display, and estimate a location of the hand of the operator in the robot world based on the hand motion information of the operator acquired from the hand wear controller, calculating first distances between the gaze point and the operation candidate objects and second distances between the hand and the operation candidate objects, and calculating the probability distribution with respect to all the operation candidate objects based on the first distances between the gaze point and the objects as operation candidates and the second distances between the hand and the objects as operation candidates, wherein the probability distribution is determined based on numbers of times that the gaze point of the operator is overlapped with the objects as the operation candidates.

\* \* \* \* \*